United States Patent [19]

Saito et al.

[11] Patent Number: 4,560,615

[45] Date of Patent: Dec. 24, 1985

[54] ALKALI-PROOF CAST ALUMINUM PRODUCT HAVING A WEAR-RESISTANT SURFACE LAYER

[75] Inventors: Yu Saito, Kobe; Tsuneo Harada, Sakai, both of Japan

[73] Assignees: Kawasaki Jukogyo Kabushiki Kaisha, Kobe; Daiwa Alloy Mfg. Co., Osaka, both of Japan

[21] Appl. No.: 608,880

[22] Filed: May 10, 1984

[30] Foreign Application Priority Data

May 13, 1983 [JP] Japan .................................. 58-84634

[51] Int. Cl.⁴ .................................................. B32B 5/16

[52] U.S. Cl. .................................... 428/328; 428/331; 428/406; 428/418; 428/428; 428/429; 428/448; 428/450; 428/454; 428/698; 428/701; 427/295; 427/221

[58] Field of Search ............... 428/406, 418, 428, 429, 428/448, 450, 454, 328, 698, 701; 427/216, 217, 221

[56] References Cited

U.S. PATENT DOCUMENTS 4,234,653 11/1980 Ballard et al. ...................... 428/454

4,283,449 6/1981 Damminger .......................... 428/72

*Primary Examiner*—Patrick C. Ives

*Attorney, Agent, or Firm*—Leydig, Voit & Mayer

[57] ABSTRACT

An alkali-proofed cast aluminum product having a wear-resistant surface layer thereon comprising a number of wear-resistant granules with partially projected form inserted into the surface of a base material containing aluminum as a main component, cavities open to the surface of said base material being filled with a first alkali-resistant impregnating material, and the whole surfaces of the base material including the wear-resistant granules being covered with a coating of a second alkali-resistant material is excellent in alkali resistance and prevents the wear-resistant surface from the falling out of wear-resistant granules.

18 Claims, 5 Drawing Figures

ALKALI-PROOF CAST ALUMINUM PRODUCT HAVING A WEAR-RESISTANT SURFACE LAYER

BACKGROUND OF THE INVENTION

The present invention relates to an alkali-proof cast aluminum product having a wear-resistant surface layer and a process for producing said product.

Today, cast aluminum products are extensively used in various fields of the industry. For example, they are utilized as a doorsill having the shape of FIG. 1 in the field of rolling stocks, as a step material for staircases, as a floor material, and so on. Particularly, the above-mentioned doorsill made of cast aluminum product is desirable from the viewpoint of reducing the weight of rolling stocks which is necessary for saving the driving energy and decreasing the load laid upon rails and bridges. Further, a surface structure exhibiting an antislip function is sometimes required of this type of cast aluminum product from the viewpoint of ensuring the safety of passengers getting on and off buses, trains and the like. For these purposes, it has been proposed to improve the wear-resistance and antislip function of the surface of base material by cast-embedding a number of wear-resistant granules of SiC, $Al_2O_3$, corundum, alundum or the like so that the granules partially protrude above the surface.

Now, the surface of step decks and similar articles must be cleaned frequently, because it is soiled in a short period of time by many persons walking thereon. A cleanser used for cast aluminum product must be weaker in alkalinity than a cleanser for iron or steel, because aluminum is inferior to iron and steel in alkali resistance.

However, it is the actual state of the art at the present stage that, when cast aluminum products are used in combination with iron or steel products, nevertheless, a strongly alkaline cleanser suitable for iron and steel products is directly applied to aluminum products. Such a cleanser is so strongly alkaline as to have a pH value of 11.5 to 13.7. If such a cleanser is directly applied to cast aluminum product, the surface of the aluminum is slightly lost by dissolution (alkali corrosion), due to which the cast aluminum product having the above-mentioned surface structure decreases or loses the supporting power exercised on the wear-resistant granules so that the granules are lost from the surface and the wear-resistance and anti-slip function of the product are markedly deteriorated. In addition, a part of the strongly alkaline cleanser penetrates into the open cavities on the surface of the cast product to corrode the inner part of the product, as a result of which the cast aluminum product decreases its strength.

SUMMARY OF THE INVENTION

The present invention has been accomplished with an aim of overcoming the above-mentioned difficulties in the prior art. It is an object of the invention to provide an alkali-proof cast aluminum product having a wear-resistant layer on its surface which is protected against the corrosive action of alkaline cleanser exercised upon aluminum, prevented from a decrease in internal strength caused by loss of the wear-resistant granules and quite excellent in durability, as well as to provide a process for producing said cast aluminum product.

Thus, the invention provides an alkali-proof cast aluminum product having a wear-resistant surface layer thereon comprising a plurality of wear-resistant granules with partially projected form inserted into the surface of a base material containing aluminum as a main component, cavities open to the surface of said base material being filled with a first alkali-resistant material, and the whole surface of the base material including the wear-resistant granules being covered with a coating of a second alkali-resistant material.

The invention also provides a process for producing an alkali-proof cast aluminum product having a wear resistant surface layer thereon which comprises maintaining in an impregnating chamber under a reduced pressure an unprocessed cast aluminum product prepared by inserting a plurality of wear-resistant granules with partially projected form into the surface of a base material containing aluminum as a main component,

- introducing a liquid first alkali-resistant material into said impregnating chamber,
- subjecting cavities open to the surface of said base material to an impregnating treatment with said first alkali-resistant material to fill the cavities under a positive pressure,
- forming a coating of a second alkali-resistant material on the surface of the thus treated base material, and curing the resulting coating.

BRIEF DESCRIPTION OF THE DRAWINGS

The accompanying drawings illustrate an embodiment of the present invention, wherein.

DESCRIPTION OF PREFERRED EMBODIMENTS

Hereunder, the invention will be illustrated in detail with reference to the drawings.

Figure 1:
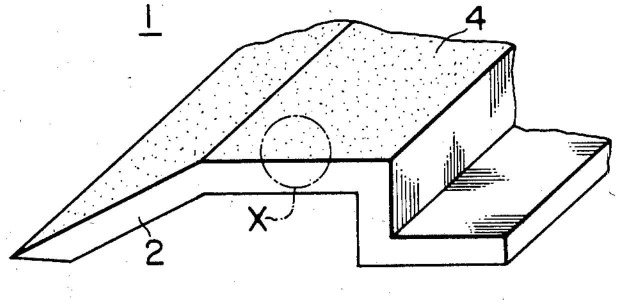
FIG. 1 is a partially cutaway perspective view of a step deck material.
Figure 2:
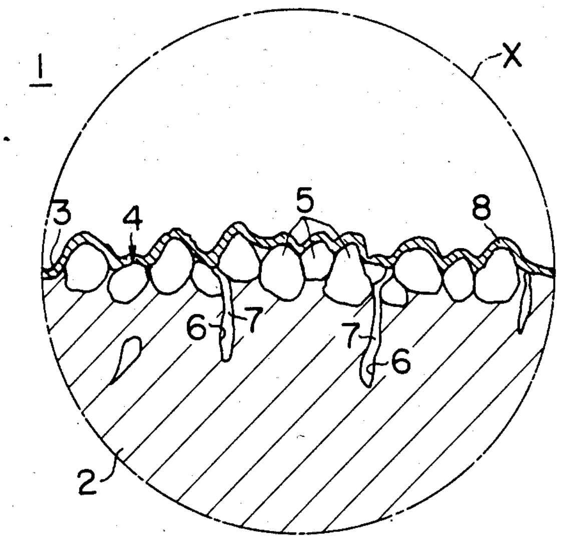
FIG. 2 is an enlarged elevational sectional view of the circle marked with "X" in FIG. 1.

An example of the cast aluminum product of the invention is shown in FIG. 1. In FIG. 1, cast aluminum product 1 is a step deck material (doorsill) to be attached to entrances of rolling stocks. It has a wear-resistant layer 4 on the surface 3 (see FIG. 2) of base material 2 made of aluminum or an aluminum alloy. As shown in FIG. 2, the wear-resistant layer 4 is formed by inserting a number of wear-resistant granules 5 in such a state that the granules 5 partially protrude above the surface 3 of the base material 2 and are distributed on the surface 3.

As the wear-resistant granule 5, wear-resistant materials such as SiC, $Al_2O_3$, corundum, alundum, siliceous sand, and the like can be used either alone or as a mixture thereof. The particle size of the granule can be selected freely, but the particle size of 0.5 mm to 5 mm is preferable.

As the base material 2, aluminum or alloys composed mainly of aluminum such as Al-Si alloys, Al-Cu alloys, Al-Cu-Si alloys, Al-Si-Mg alloys, Al-Si-Cu alloys, Al-Si-Cu-Mg alloys, Al-Cu-Ni-Mg alloys, Al-Mg alloys, Al-Si-Cu-Ni-Mg alloys, can be used.

The surface 3 of the base material 2 has been subjected to an alkali-proofing treatment. That is, of cavities 6 present in the base material 2, those open to the surface 3 are filled with a first alkali-resistant impregnating material 7 and, at the same time, the surface of the wear-resistant layer 4, i.e. the whole area of the surface 3 of the base material 2 including the wear-resistant granules 5 is covered by a second alkali-resistant coating 8.

As the alkali-resistant material constituting the impregnating material 7 and the coating 8, there can be used alkali-resistant thermosetting resin coating compositions or adhesives. Examples of thermosetting resins are room temperature curing and heat curing epoxy resins, room temperature curing and heat curing urethane resins, and the like.

The impregnating material 7 and the coating 8 may be constituted of the same alkali-resistant material or of different alkali-resistant materials. Typical examples thereof are shown below:

(1) Impregrating material 7 . . . Epoxy coating material (a) Chemical composition:

"E-1007" (trade name of epoxy resin manufactured by Yuka-Shell Epoxy K.K.): 100 parts by wt.

"Uban 20SE-60" (trade name of curing agent manufactured by Mitsui Toatsu Chemicals Inc.): 25 parts by wt.

Cellosolve acetate/Xylene (1/1) (manufacture by Konishi K.K.): 40 parts by wt.

(2) Coating 8 . . . Epoxy coating material (b) Chemical composition:

"Epikote 1009" (trade name of epoxy resin manufactured by Yuka-Shell Epoxy K.K.): 100 parts by wt.

"Uban 20SE-60" (see above): 30 parts by wt.

Acetate (manufactured by Kishida Kagaku K.K.): 20 parts by wt.

Xylene (manufactured by Konishi K.K.): 45 parts by wt.

The epoxy coating material (b) is particularly suitable for use when the following Cleaner C is used as a cleanser for the step deck material 1.

(3) Cleaner C (strongly alkaline cleanser) "Du Jet & Gel" (trade name of a product manufactured by US DU Bois Co.)

Chemical composition:

Potassium hydroxide: 3.4% by wt.

Surfactants: 6.6% by wt.

Sodium gluconate: 4.3% by wt.

Water :85.7% by wt.

Next, the process for producing the step deck material 1 which is an example of the cast aluminum product of the invention will be explained by referring to FIG. 3.

Impregnating Step (I)

This is a step for increasing the internal strength of step deck material 1.

Figure 4:
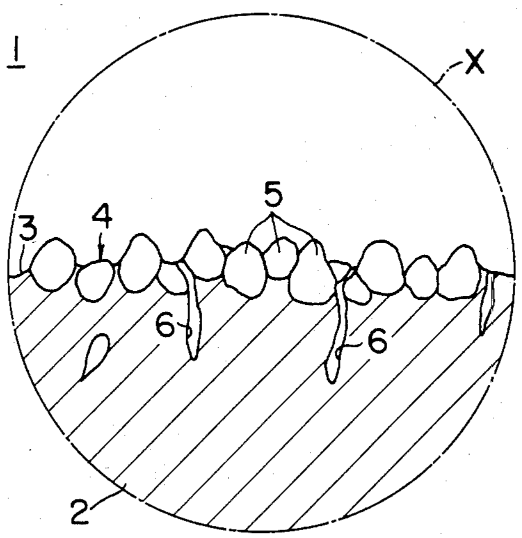
FIG. 4 illustrates the state of the circle X before the start of impregnating step mentioned in FIG. 3.

(i) Firstly, the step deck material 1 formed by inserting wear-resistant granules 5 (e.g. granular SiC) into the surface 3 of the base material 2 as shown in FIG. 4 is subjected to a cleaning treatment $I_1$. Thereafter, the step deck material 1 is introduced into an impregnating chamber 12 connected to a pressure-reducing pump 9, a pressure-elevating pump 10 and a feed tank 11, and the pressure reducing pump 9 is worked to maintain the inner space of the impregnating chamber 12 at a negative pressure or a vacuum of 8 to 12 mmHg.

(ii) Subsequently, an impregnating solution or a liquid alkali-resistant material (e.g. the above-mentioned epoxy coating material (a)) is supplied from the feed tank 11 into the impregnating chamber 12. Then, the pressure-elevating pump 10 is worked to supply a compressed air into the impregnating chamber 12, whereby the pressure in the impregnating chamber 12 rapidly changes from a negative pressure to a positive pressure. As a result, the impregnating solution fed to the impregnating chamber 12 is forced into cavities 6 (see FIG. 4) open to the surface 3 of the step deck material 1, and fills the cavities. This is impregnating treatment $I_2$.

Figure 5:
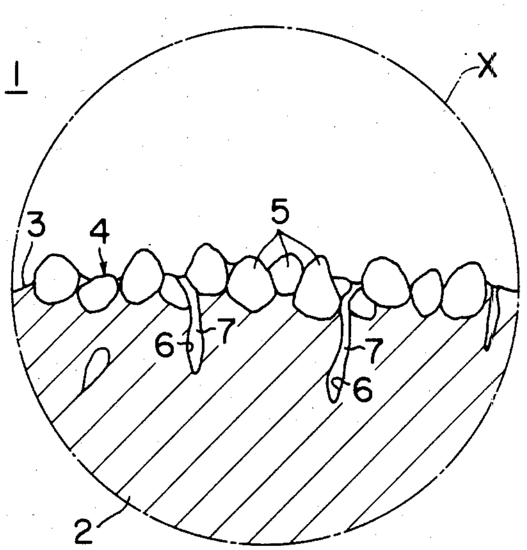
FIG. 5 illustrates the state of the circle X after completion of the impregnating step.

(iii) The step deck material 1 is taken out of the impregnating chamber 12 and the impregnating solution adhering to its surface 3 is removed, after which the step deck material 1 is subjected to a baking treatment $I_3$ by heating it preferably at 150° C. to 200° C. by means of a baking apparatus 13. As a result, the impregnating solution filling the cavities 6 of step deck material 1 is cured to form an impregnating material 7 (see FIG. 5).

Coating and Baking Steps (II)

This is a step for increasing the surface strength of the step deck material 1.

(iv) The step deck material which has been subjected to the so-called "cavity-blinding" treatment according to impregnating step (I) is washed with a neutral detergent solution, and its surfaces other than the surface 3 (the surfaces on which wear-resistant layer 4 is not formed) are appropriately covered. Then, the surface 3 is coated with a liquid alkali-resistant material (e.g. the above-mentioned epoxy coating material (b)) by the use of a brush or spray gun or by the method of dipping so as to give a coating thickness of about 0.01 to 1.00 mm. This is coating treatment $II_1$.

(v) Finally, the step deck material 1 is again subjected to a baking treatment ($II_2$) preferably at a temperature of 150° C. to 200° C. by means of a baking apparatus 14. Thus, the alkali-resistant material applied to the surface 3 cures to form a coating 8, and there is obtained a product having an alkali-proofed surface 3.

Next, the following test samples 1 to 3 are prepared and subjected to an alkali-resistance test in order to evaluate the alkali-resistance of the step deck 1 which has been treated in the above-mentioned manner.

(a) SAMPLES

Sample 1

(A Product of the Present Invention)

This is a sample which has been prepared in the following manner. That is, a base material having a size of 50 mm (length)×50 mm (width)×8 mm (thickness) and composed of an Al-Si alloy (95% Al and 5% Si) is prepared. A number of SiC granules (particle size 0.5 to 1 mm) are inserted (cast-embedded) into the base material to prepare "base material A". After filling its cavities with the epoxy coating material (a), its surface is coated with the epoxy coating material (b) by means of a brush so as to give a coating thickness of 0.02 mm to cover the above-mentioned SiC granules completely. Then, it is baked at 200° C.

Sample 2

(Comparative Sample)

This is a sample prepared by subjecting the surface of the above-mentioned base material A to a chromate treatment.

Sample 3

(Comparative Sample)

This is a sample prepared by subjecting the surface of the above-mentioned base material A to an anodic oxidation film-forming treatment.

(b) TEST PROCEDURE

Each of the samples prepared above is cleaned in a neutral detergent solution by the use of a toothbrush, and then it is weighed. After covering the surface of this sample, except for the surface involving the SiC granules, with a tape, the sample is dipped in a 33% (by weight) solution of the above-mentioned Cleaner C for a period of $4+\frac{1}{3}$ hours (this period of dipping corresponds to the total washing time necessary for 365 washing operations over 20 years). Then the sample is taken out of the solution, allowed to stand in a humidity-controlled box (RH 100%) for 15 hours and then left standing in the atmospheric air till it becomes dry, whereby the Cleaner C is completely removed. Thereafter, the sample is weighed and the extent of falling-off of the SiC granules is evaluated.

The results of the test are listed in Table 1.

TABLE 1

| | Loss in weight ($g/dm^2$) | Falling-off of granules |
|---|---|---|
| Sample 1 | 0.43 | None |
| Sample 2 | 5.31 | Remarkable |
| Sample 3 | 5.55 | Remarkable |

It is clear from Table 1 both the comparative samples (Samples 2 to 3) have been remakably corroded by the strongly alkaline cleanser (Cleaner C) or show a great loss in weight, indicating their inferiority in alkali resistance, with a considerably high extent of falling-off of the SiC granules, whereas the product of the invention (Sample 1) has been corroded only to a small extent by the strongly alkaline cleanser or shows only a small loss in weight, demonstrating its excellency in alkali resistance, and shows no falling-off of SiC granules at all.

The present invention is applicable not only to the above-mentioned step deck material 1 but also to other cast aluminum products such as step material for staircases, floor material and the like. When the impregnating material 7 and the coating 8 are to be constituted of the same alkali-resistant material, the coating and baking steps (II) shown in FIG. 3 is unnecessary. That is, if a step deck material 1 is subjected to the impregnating treatment $I_2$ in the impregnating step I and then the impregnated material 1 is directly subjected to baking treatment $I_3$ without removing the alkali-resistant material adhering to the surface 3 of the impregnated step deck material 1, it is possible to form coating 8 simultaneously with the cure of the impregnating material 7. The particle size of the wear-resistant granules 5 and the thickness of the coating 8 may be appropriately selected so as to meet with the purpose, without being restricted by the examples presented above.

As has been detailed above, the product of the invention is constructed by forming an alkali-resistant coating on its surface with many wear-resistant particles inserted thereinto. Therefore, the product of the invention is quite excellent in alkali resistance and can prevent the corrosive action of alkali from affecting the cast aluminum and prevents the wear-resistant particles from falling-off even when a strongly alkaline cleanser is used. Further, by appropriately selecting the alkali-resistant material, it is also possible to ensure such mechanical strength of the product of the invention enough to protect it against injury caused by numerous persons walking thereon, or to give the product of the invention an appropriate elasticity in order to ensure comfortable walking.

Further, among the many cavities present in the cast aluminum product of the invention, those open to the surface of the product are filled with an alkali-resistant impregnating material. Accordingly, even if the above-mentioned coating is broken by some cause, the permeation of the strongly alkaline cleanser into the cavities can be stopped and the internal body of the cast aluminum product can be protected from the corrosion caused by the alkali. This is another excellent effect of the invention.

Figure 3:
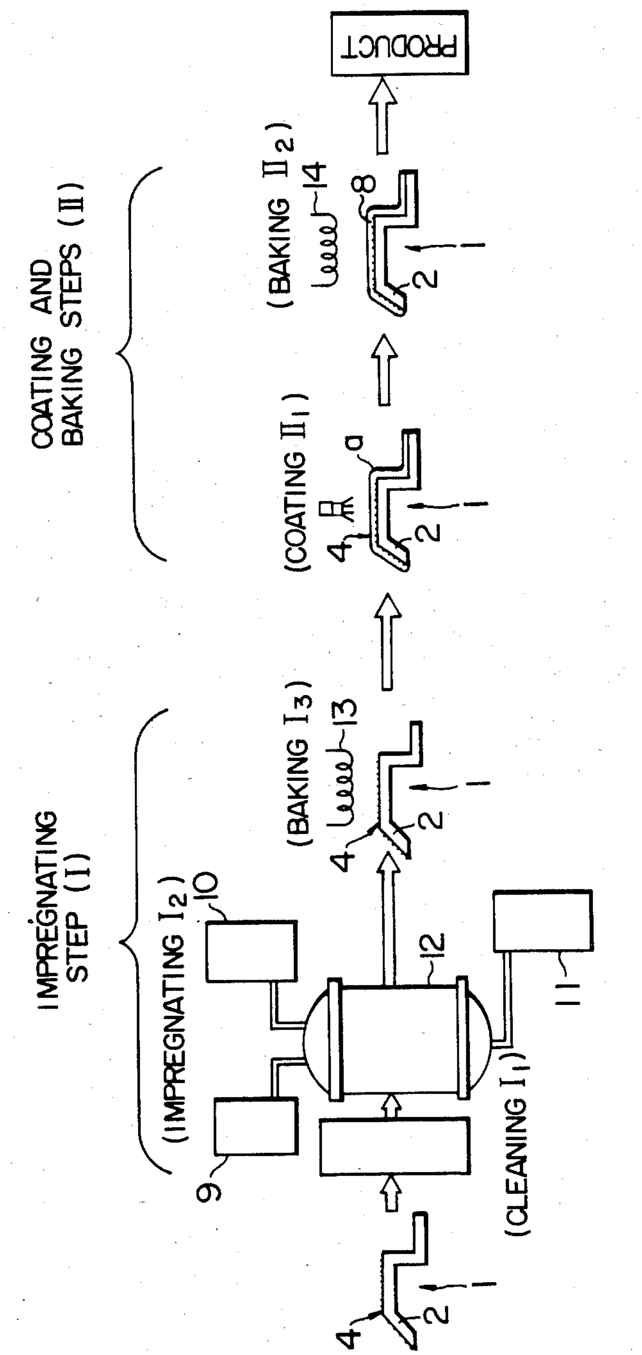
FIG. 3 is a flow chart illustrating the production process of the step desk.

In addition, in the process as shown in FIG. 3, the baking step is employed in ($I_3$) and ($II_2$). But when a room temperature curing thermosetting resin composition is used as the alkali-resistant material, the baking step can be omitted for curing. But the curing with heating (baking) is preferable considering efficiencies of the process.

What is claimed is:

1. An alkali-proof cast aluminum having a wear-resistant surface layer thereon comprising:

a base material containing aluminum as the main component, said base material having cavities extending to the surface thereof;

a plurality of wear-resistant granules embedded in and partially projecting from said base material;

a first alkali-resistant material in said cavities; and a second alkali-resistant material forming a coating covering the outer surfaces of said granules and said base material.

2. A cast aluminum product according to claim 1, wherein said base material containing aluminum as a main component is at least one member selected from the group consisting of an Al-Si alloy, an AL-Cu alloy, an Al-Cu-Si alloy, an Al-Si-Mg alloy, an Al-Si-Cu alloy, an Al-Si-Cu-Mg alloy, Al-Cu-Ni-Mg alloy, an Al-Mg alloy, and an Al-Si-Cu-Ni-Mg alloy.

3. A cast aluminum product according to claim 1, wherein said wear-resistant granule is a granule is a granule of SiC, $Al_2O_3$, corundum, alundum, siliceous sand or a mixture thereof.

4. A cast-aluminum product according to claim 1 wherein at least one of said first and second alkali-resistant materials comprise alkali-resistant thermosetting resins.

5. A cast aluminum product according to claim 1 wherein said first alkali-resistant material and said second alkali-resistant material comprise the same alkali-resistant material.

6. A cast aluminum product according to claim 5 wherein both of said first and second alkali-resistant materials comprise an alkali-resistant thermosetting resin composition.

7. A cast aluminum product according to claim 1 wherein said first alkali-resistant material and said second alkali-resistant material comprise different alkali-resistant materials.

8. A cast aluminum product according to claim 7 wherein the different alkali-resistant materials comprise different kinds of alkali-resistant thermosetting resin compositions.

9. A cast aluminum product according to claim 5 wherein said same alkali-resistant material is a urethane resin composition.

10. A cast aluminum product according to claim 5 wherein said same alkali-resistant material is an epoxy resin composition.

11. A cast aluminum product according to claim 7 wherein the different alkali-resistant materials are different kinds of urethane resin compositions.

12. A cast aluminum product according to claim 7 wherein the different alkali-resistant materials are different kinds of epoxy resin compositions.

13. A cast aluminum product according to claim 7 wherein the different alkali-resistant materials are a urethane resin composition and an epoxy resin composition.

14. A cast aluminum product according to claim 10 wherein the epoxy resin composition is cured with heating.

15. A cast aluminum product according to claim 9 wherein the urethane resin composition is cured with heating.

16. A cast aluminum product according to claim 11 wherein the urethane resin compositions are cured with heating.

17. A cast aluminum product according to claim 12 wherein the epoxy resin compositions are cured with heating.

18. A cast aluminum according to claim 1 wherein said granules have particle sizes in the range of from about 0.5 mm to about 5 mm.

* * * * *

UNITED STATES PATENT AND TRADEMARK OFFICE

CERTIFICATE OF CORRECTION

PATENT NO. : 4,560,615

DATED : December 24, 1985

INVENTOR(S) : Saito et al

It is certified that error appears in the above-identified patent and that said Letters Patent is hereby corrected as shown below:

On the face of the patent, please amend the name of the second Assignee from "Daiwa Alloy Mfg. Co." to --Daiwa Alloy Mfg. Co., Ltd.--.

Signed and Sealed this

*Twenty-fourth* Day of *June 1986*

[SEAL]

*Attest:*

DONALD J. QUIGG

*Attesting Officer* *Commissioner of Patents and Trademarks*